United States Patent
Wang et al.

(10) Patent No.: US 6,867,251 B2
(45) Date of Patent: Mar. 15, 2005

(54) POLYMER DYE PARTICLES AND PROCESS FOR MAKING POLYMER DYE PARTICLES

(75) Inventors: Xiaoru Wang, Rochester, NY (US); Huijuan D. Chen, Webster, NY (US)

(73) Assignee: Eastman Kodak Company, Rochester, NY (US)

( * ) Notice: Subject to any disclaimer, the term of this patent is extended or adjusted under 35 U.S.C. 154(b) by 366 days.

(21) Appl. No.: 10/020,694

(22) Filed: Dec. 14, 2001

(65) Prior Publication Data

US 2003/0119984 A1 Jun. 26, 2003

(51) Int. Cl.[7] .............................. C08K 5/23; C08F 2/16; C08L 33/00
(52) U.S. Cl. ...................... 524/190; 524/804; 524/812; 524/819; 524/832; 523/202
(58) Field of Search .................. 524/190, 804, 524/812, 819, 832; 523/202

(56) References Cited

U.S. PATENT DOCUMENTS

| | | | |
|---|---|---|---|
| 4,507,378 A | 3/1985 | Wada et al. | |
| 4,680,332 A | 7/1987 | Hair et al. | |
| 4,698,651 A | * 10/1987 | Moore et al. | ............... 503/227 |
| 4,771,086 A | 9/1988 | Martin | |
| 5,302,195 A | 4/1994 | Helbrecht et al. | |
| 5,837,754 A | 11/1998 | Shimomura et al. | |
| 5,958,998 A | 9/1999 | Foucher et al. | |
| 5,965,634 A | 10/1999 | Idogawa et al. | |
| 5,997,622 A | * 12/1999 | Weber et al. | ............. 106/31.48 |
| 6,001,161 A | * 12/1999 | Evans et al. | ............. 106/31.48 |
| 6,011,662 A | 1/2000 | Evans | |
| 6,031,019 A | 2/2000 | Tsutsumi et al. | |
| 6,153,667 A | 11/2000 | Howald | |
| 6,309,787 B1 | * 10/2001 | Cheng | ................... 430/137.14 |
| 6,454,403 B1 | 9/2002 | Takada et al. | |
| 2001/0023267 A1 | * 9/2001 | Ishizuka et al. | ............... 524/86 |

FOREIGN PATENT DOCUMENTS

| | | |
|---|---|---|
| EP | 1.006161 | 6/2000 |
| EP | 1182050 | 2/2002 |
| EP | 1205522 | 5/2002 |
| EP | 1.245588 | 10/2002 |
| EP | 1245653 | 10/2002 |
| JP | 04185672 A | 7/1992 |
| JP | 297126 A | 10/2000 |
| WO | WO 98/14524 | 4/1998 |

OTHER PUBLICATIONS

U.S. Appl. No. 09/510,879 of Huijuan D. Chen et al, filed Feb. 23, 2000 "Ink Jet Printing Method".

* cited by examiner

*Primary Examiner*—Tae H. Yoon
(74) *Attorney, Agent, or Firm*—Sarah Meeks Roberts

(57) ABSTRACT

This invention relates to a process for making polymer-dye particles comprising, in order:
- I) forming a colorant mixture comprising a water insoluble dye and an organic medium containing at least one ethylenically-unsaturated monomer;
- II) combining the colorant mixture with an aqueous mixture comprising a surfactant and a co-stabilizer to form a colorant mixture/aqueous mixture;
- III) causing the colorant mixture/aqueous mixture to form a stable aqueous droplet mixture via strong agitation; and
- IV) initiating polymerization to form composite polymer-dye particles comprising a colorant phase and a polymer phase;

wherein an addition polymerization initiator is added prior to initiating polymerization.

It further relates to composite polymer dye particles prepared by the above process and to composite polymer dye particles comprising a colorant phase containing a water insoluble dye, and a polymer phase, said particles being associated with a co-stabilizer.

19 Claims, No Drawings

POLYMER DYE PARTICLES AND PROCESS FOR MAKING POLYMER DYE PARTICLES

FIELD OF THE INVENTION

This invention relates to polymer-dye particles and the preparation of polymer-dye particles. It more particularly relates to polymer-dye particles and to the preparation of particles which comprise water insoluble dyes and polymer. The polymer-dye particles are useful for forming ink jet inks for ink jet printing.

BACKGROUND OF THE INVENTION

Ink jet printing is a non-impact method for producing images by the deposition of ink droplets on a substrate (paper, transparent film, fabric, etc.) in response to digital signals. Ink jet printers have found broad applications across markets ranging from industrial labeling to short-run printing to desktop document and pictorial imaging.

In ink jet recording processes, it is necessary that the inks being used meet various performance requirements. Such performance requirements are generally more stringent than those for other liquid ink applications, such as for writing instruments (e.g., a fountain pen, felt pen, etc.). In particular, the following conditions are generally required for inks utilized in ink jet printing processes:

(1) The ink should possess physical properties such as viscosity, surface tension, and electric conductivity matching the discharging conditions of the printing apparatus, such as the driving voltage and driving frequency of a piezoelectric electric oscillator, the form and material of printhead orifices, and the diameter of the orifices;

(2) The ink should be capable of being stored for a long period of time without causing clogging of printhead orifices during use;

(3) The ink should be quickly fixable onto recording media, such as paper, film, etc., such that the outlines of the resulting ink dots are smooth and there is minimal blotting of the dotted ink;

(4) The printed image should be of high quality, such as having a clear color tone, high density, high gloss, and high color gamut;

(5) The printed image should exhibit excellent waterfastness (water resistance) and lightfastness (light resistance);

(6) The printed (ink) images should have good adhesion to the surface of image receiving elements and should be durable and highly resistant to physical and mechanical scratches or damages;

(7) The ink should not chemically attack, corrode, or erode surrounding materials such as the ink storage container, printhead components, orifices, etc;

(8) The ink should not have an unpleasant odor and should not be toxic or inflammable; and (9) The ink should exhibit low foaming and high pH stability characteristics.

The inks used in various ink jet printers can be classified as either dye-based or pigment-based. Pigment-based inks have some deficiencies. For example, pigment-based inks interact differently with specially coated papers and films such as transparent films used for overhead projection and glossy papers or opaque white films used for high quality graphics and pictorial output. This results in images that have poor dry and wet adhesion properties and that can be easily smudged.

Another deficiency from which pigmented inks suffer is their poor storage stability due to the presence of a water-miscible organic solvent. Water-miscible organic solvents are used to adjust ink rheology, to maximize ink firability and re-runability. These solvents prevent ink from drying in a printing head and lower ink surface tension to minimize the effect of air entrapment in an ink formulation. Such air entrapment generates air bubbles which can seriously affect the head performance. Unfortunately, these water-miscible organic solvents can also have a negative effect on the colloidal stability of pigment particles in an ink formulation.

A dye is a colorant which is molecularly dispersed or solvated by a carrier medium. The carrier medium can be a liquid or a solid at room temperature. Known ink jet inks generally comprise a water soluble dye which is soluble in an ink vehicle such as water or a mixture comprising water and a known water soluble or water miscible organic solvent. Inks comprising these soluble dyes may exhibit many problems, such as low optical densities on plain paper, poor water-fastness, poor lightfastness, clogging of the jetting channels as a result of solvent evaporation, and changes in the solubility of the dyes, dye crystallization, and ink bleeding. There is a need to develop a water resistant dye-based ink and to improve the existing inks. More specifically, there is a need to develop inks that provide high quality prints on a wide variety of recording media, including plain paper. Particularly, there is a great need to develop dye-based inks which have high optical densities on receivers and also superior lightfastness and colorfastness. These and other needs may be achievable in embodiments of the present invention.

Oil soluble (water insoluble) dyes have been studied to achieve these requirements. Some inks use organic solvents, but such inks have environmental considerations. Water-based oil soluble dye inks have the advantages of low pollution, low price, and good quality. It is difficult, however, to form a stable dispersion of oil soluble dye in water media. WO 98/14524 and U.S. application Ser. No. 09/510,879 disclose oil soluble colorants which have been dissolved in organic solvents and added to aqueous polymer latexes slowly under agitation. After mixing, the organic solvent is evaporated and the colorant is loaded to the polymer particles. The mixture is used to formulate ink jet inks with the addition of water, humectants, and some other additives. U.S. Pat. No. 5,958,998 discloses an ink composition containing an oil soluble colorant. The composition is made by flushing pigment into a sulfonated polyester resin having a degree of sulfonation of about 2.5 to about 20 mol percent, dispersing the pigmented polyester resin in water at a temperature of from about 40° C.–95° C., and thereafter separating and mixing. The dispersing is done by a shearing device operating at speeds of 100 to 5000 revolutions which yields stable pigmented submicron sized particles of from about 5 to about 150 nanometers. However, the amount of colorant that may be loaded in the polymer is limited.

JP 00297126A discloses a process for making an ink composition wherein polymer-colorant particles are prepared using a batch emulsion polymerization process employing colorant, monomers, and an initiator. This process, however, involves more micelle particle nucleation and polymer particles are produced. When formulated into an ink jet ink, the presence of free polymers (both polymer particles and water-soluble polymers) can significantly increase ink viscosity, decrease ink storage stability, cause premature printing head failure, and generate image defects.

There is still needed a colorant particle dispersion that has improved compatibility with water-soluble organic solvents and improved stability in an ink jet composition. There is further a need for an ink composition which, when printed, provides images on the surface of an ink jet recording element having improved image quality, improved physical durability such as scratch and smudging resistance, and improved image stability such as colorfastness and waterfastness.

SUMMARY OF THE INVENTION

This invention provides a process for making polymer-dye particles comprising, in order:

I) forming a colorant mixture comprising a water insoluble dye and an organic medium containing at least one ethylenically-unsaturated monomer;

II) combining the colorant mixture with an aqueous mixture comprising a surfactant and a co-stabilizer to form a colorant mixture/aqueous mixture;

III) causing the colorant mixture/aqueous mixture to form a stable aqueous droplet mixture via strong agitation; and IV) initiating polymerization to form composite polymer-dye particles comprising a colorant phase and a polymer phase;

wherein an addition polymerization initiator is added prior to initiating polymerization.

This invention further provides composite polymer-dye particles prepared by the above process. It also provides composite polymer-dye particles comprising a colorant phase, containing a water insoluble dye, and a polymer phase, said particles being associated with a co-stabilizer.

The final composite polymer-dye particles made by the process of the invention have better stability than those prepared by the prior art. The particles are also more stable during the manufacturing process. An ink formulated with such particles has improved ozone stability, colloid stability, and good resistance to abrasion.

DETAILED DESCRIPTION OF THE INVENTION

In accordance with the present invention, a colorant mixture is formed which comprises a water insoluble dye and an organic medium comprising ethylenically-unsaturated monomers. Generally the water insoluble dye is dissolved at room temperature in an organic medium containing ethylenically-unsaturated monomers to form the colorant mixture.

A broad range of water-insoluble dyes may be used in the invention such as an oil dye, a disperse dye, or a solvent dye, such as Ciba-Geigy Orasol Red G, Ciba-Geigy Orasol Blue GN, Ciba-Geigy Orasol Pink, and Ciba-Geigy Orasol Yellow. Preferred water-insoluble dyes can be xanthene dyes, methine dyes, polymethine dyes, anthroquinone dyes, merocyanine dyes, azamethine dyes, azine dyes, quinophthalone dyes, thiazine dyes, oxazine dyes, phthalocyanine dyes, mono or poly azo dyes, and metal complex dyes. More preferably, the water insoluble dyes can be an azo dye such as a water insoluble analog of the pyrazoleazoindole dye disclosed in U.S. patent application Ser. No. 09/689,184 filed Oct. 12, 2000, incorporated herein by reference, and the arylazoisothiazole dye disclosed in U.S. Pat. No. 4,698,651, incorporated herein by reference, or a metal-complex dye, such as the water-insoluble analogues of the dyes described in U.S. Pat. Nos. 5,997,622 and 6,001,161, both incorporated herein by reference, i.e., a transition metal complex of an 8-heterocyclylazo-5-hydroxyquinoline. The solubility at 25° C. of the water insoluble dye used in the present invention should be less than 1 g/L in water, and more preferably less than 0.5 g/L in water.

The ethylenically-unsaturated monomers which can be used in the invention include, for example, the following monomers and their mixtures: acrylic acid, methacrylic acid, ethacrylic acid, methyl acrylate, ethyl acrylate, ethyl methacrylate, benzyl acrylate, benzyl methacrylate, propyl acrylate, propyl methacrylate, iso-propyl acrylate, iso-propyl methacrylate, butyl acrylate, butyl methacrylate, hexyl acrylate, hexyl methacrylate, octadecyl methacrylate, octadecyl acrylate, lauryl methacrylate, lauryl acrylate, hydroxyethyl acrylate, hydroxyethyl methacrylate, hydroxyhexyl acrylate, hydroxyhexyl methacrylate, hydroxyoctadecyl acrylate, hydroxyoctadecyl methacrylate, hydroxylauryl methacrylate, hydroxylauryl acrylate, phenethylacrylate, phenethyl methacrylate, 6-phenylhexyl acrylate, 6-phenylhexyl methacrylate, phenyllauryl acrylate, phenyllaurylmethacrylate, 3-nitrophenyl-6-hexyl methacrylate, 3-nitrophenyl-18-octadecyl acrylate, ethyleneglycol dicyclopentyl ether acrylate, vinyl ethyl ketone, vinyl propyl ketone, vinyl hexyl ketone, vinyl octyl ketone, vinyl butyl ketone, cyclohexyl acrylate, 3-methacryloxypropyl-dimethylmethoxysilane, 3-methacryloxypropyl-methyldimethoxysilane, 3-methacryloxypropyl-pentamethyldisiloxane, 3-methacryloxypropyltris-(trimethylsiloxy)silane, 3-acryloxypropyl-dimethylmethoxysilane, acryloxypropylmethyldimethoxysilane, trifluoromethyl styrene, trifluoromethyl acrylate, trifluoromethyl methacrylate, tetrafluoropropyl acrylate, tetrafluoropropyl methacrylate, heptafluorobutyl methacrylate, isobutyl acrylate, isobutyl methacrylate, 2-ethylhexyl acrylate, 2-ethylhexyl methacrylate, isooctyl acrylate, isooctyl methacrylate, N,N-dihexyl acrylamide, N,N-dioctyl acrylamide, N,N-dimethylaminoethyl acrylate, N,N-dimethylaminoethyl methacrylate, N,N-diethylaminoethyl acrylate, N,N-diethylaminoethyl methacrylate, piperidino-N-ethyl acrylate, vinyl propionate, vinyl acetate, vinyl butyrate, vinyl butyl ether, and vinyl propyl ether ethylene, styrene, vinyl carbazole, vinyl naphthalene, vinyl anthracene, vinyl pyrene, methyl methacrylate, methyl acrylate, alpha-methylstyrene, dimethylstyrene, methylstyrene, vinylbiphenyl, glycidyl acrylate, glycidyl methacrylate, glycidyl propylene, 2-methyl-2-vinyl oxirane, vinyl pyridine, aminoethyl methacrylate, aminoethylphenyl acrylate, maleimide, N-phenyl maleimide, N-hexyl maleimide, N-vinyl-phthalimide, and N-vinyl maleimide poly(ethylene glycol) methyl ether acrylate, polyvinyl alcohol, vinyl pyrrolidone, vinyl 4-methylpyrrolidone, vinyl 4-phenylpyrrolidone, vinyl imidazole, vinyl 4-methylimidazole, vinyl 4-phenylimidazole, acrylamide, methacrylamide, N,N-dimethyl acrylamide, N-methyl acrylamide, N-methyl methacrylamide, aryloxy dimethyl acrylamide, N-methyl acrylamide, N-methyl methacrylamide, aryloxy piperidine, and N,N-dimethyl acrylamide acrylic acid, methacrylic acid, chloromethacrylic acid, maleic acid, allylamine, N,N-diethylallylamine, vinyl sulfonamide, sodium acrylate, sodium methacrylate, ammonium acrylate, ammonium methacrylate, acrylamidopropanetriethylammonium chloride, methacrylamidopropane-triethylammonium chloride, vinyl-pyridine hydrochloride, sodium vinyl phosphonate and sodium 1-methylvinylphosphonate, sodium vinyl sulfonate, sodium 1-methylvinyl-sulfonate, sodium styrenesulfonate, sodium acrylamidopropanesulfonate, sodium methacrylamidopropanesulfonate, and sodium vinyl morpholine sulfonate, allyl methacrylate, allyl acrylate, butenyl acrylate, undecenyl acrylate, undecenyl methacrylate, vinyl acrylate, and vinyl methacrylate; dienes such as butadiene and isoprene; esters of saturated glycols or diols with unsaturated monocarboxylic acids, such as ethylene glycol diacrylate, ethylene glycol dimethacrylate, triethylene glycol dimethacrylate, 1,4-butanediol dimethacrylate, 1,3-butanediol dimethacrylate, pentaerythritol tetraacrylate, trimethylol propane trimethacrylate, and polyfunctuional aromatic compounds such as divinylbenzene and the like.

The polymer formed by the ethylenically-unsaturated monomers may be a homopolymer, a co-polymer or a cross-linked polymer. Preferably the resulting polymer is water insoluble. In one embodiment of the invention the polymer formed is a cross-linked polymer, and the ethylenically-unsaturated monomers which may be employed are a mixture of monomers which comprises a) an ethylenically-unsaturated monomer being free of ionic charge groups and capable of addition polymerization to form a substantially water-insoluble homopolymer; and b) an ethylenically-unsaturated monomer capable of being a cross-linker. In another embodiment an ethylenically-unsaturated monomer capable of addition polymerization to form a substantially water-soluble homopolymer may additionally be utilized to form the co-polymer or the cross-linked polymer. In one suitable embodiment the ratio of the ethylenically-unsaturated monomer to the cross-linking monomer is from about 97:3 to about 50:50. The ethylenically-unsaturated monomer free of ionic charge groups may comprise, for example, methyl methacrylate, ethyl methacrylate, butyl methacrylate, ethyl acrylate, butyl acrylate, hexyl acrylate, n-octyl acrylate, lauryl methacrylate, 2-ethylhexyl methaciylate, nonyl acrylate, benzyl methacrylate, 2-hydroxypropyl methacrylate, acrylonitrile, methacrylonitrile, vinyl acetate, vinyl propionate, vinylidene chloride, vinyl chloride, styrene, t-butyl styrene, vinyl toluene, butadiene, or isoprene. The water soluble ethylenically-unsaturated monomer may comprise, for example, N,N-dimethyl acrylamide, acrylic acid, methacrylic acid, chloromethacrylic acid, maleic acid, allylamine, N,N-diethylallylamine, vinyl sulfonamide, sodium acrylate, sodium methacrylate, ammonium acrylate, ammonium methacrylate, acrylamidopropane-triethylammonium chloride, methacrylamidopropane-triethylammonium chloride, vinyl-pyridine hydrochloride, sodium vinyl phosphonate and sodium 1-methylvinylphosphonate, sodium vinyl sulfonate, sodium 1-methylvinyl-sulfonate or sodium styrenesulfonate. The cross-linking ethylenically-unsaturated monomer may comprise, for example, vinyl acrylate and vinyl methacrylate; dienes such as butadiene and isoprene; esters of saturated glycols or diols with unsaturated monocarboxylic acids, such as ethylene glycol diacrylate, ethylene glycol dimethacrylate, triethylene glycol dimethacrylate, 1,4-butanediol dimethacrylate, 1,3-butanediol dimethacrylate, pentaerythritol tetraacrylate, and trimethylol propane trimethacrylate; and polyfunctuional aromatic compounds such as divinylbenzene and the like. Preferred monomer types are acrylates, styrenic, and others.

The organic medium may comprise only the ethylenically saturated monomers or it may contain an additional solvent if the dye does not have the required solubility in the monomers alone. The additional solvents used can be selected from most organic solvents, such as ethers, alcohols, tetrahydrofuran, chloroform, methylene chloride, ethylene dichloride, ethyl acetate, toluene, methanol, ethanol, ethylene glycol, diethylene glycol, triethylene glycol, etc. If a solvent is utilized, it preferably is removed after the polymerization step.

In the next step of the invention the colorant mixture is combined with an aqueous mixture comprising a surfactant and a co-stabilizer to form a colorant mixture/aqueous mixture. In accordance with the invention, the co-stabilizers used can be, for example, any of the solid colloidal materials such as clays, silica, or inorganic metal salts, hydroxides or oxides; or organic materials such as starches, sulfonated cross-linked organic homopolymers, resinous polymers and copolymers, such as copoly(styrene-2-hydroxyethyl methacrylate-methacrylic acid-ethylene glycol dimethacrylate), hexadecane, cetyl alcohol, and any steric hydrophobic stabilizers. Preferred co-stabilizers include starches, sulfonated cross-linked organic homopolymers, resinous polymers and copolymers, such as copoly(styrene-2-hydroxyethyl methacrylate-methacrylic acid-ethylene glycol dimethacrylate), hexadecane, cetyl alcohol, and any steric hydrophobic stabilizers; and most preferred co-stabilizers include hexadecane, cetyl alcohol, and any steric hydrophobic stabilizers. The amount of the co-stabilizer used can be a 0.1:1 to 10:1 ratio to the surfactants used, and more preferably a 1:1 to 10:1 ratio to the surfactants used. This step is normally performed at room temperature.

Surfactants that can be used in the present invention include, for example, a sulfate, a sulfonate, a cationic compound, a reactive surfactant, an amphoteric compound, and a polymeric protective colloid. Specific examples are described in "McCutcheon's Emulsifiers and Detergents: 1995, North American Editor" and will be known to those skilled in the art.

In accordance with the invention, the colorant mixture/aqueous mixture is mixed via strong mechanical agitation, such as by sonification, homogenation, or microfluidization to form a stable aqueous droplet mixture. The duration of the mixing time depends on the types of monomers, colorants, and surfactants. The agitation usually can be stopped between 1 minute to 40 minutes. Detailed information about the process and the stabilizers can be found in *Emulsion Polymerization and Emulsion Polymers* (P. A. Lovell, M. S. El-Aasser, John Wiley & Sons Ltd., England, 1997), incorporated herein by reference.

An addition polymerization initiator is introduced anytime prior to polymerization, preferably after the formation of the colorant mixture/aqueous mixture. After the formation of the aqueous droplet mixture, polymerization is initiated to form polymer dye particles comprising a colorant phase and a polymer phase. In accordance with the invention, a preferred way to cause an addition polymerization initiator to form a free radical is by using heat. Depending on the types of initiators used, the reaction temperature can vary from about 30° C. to about 90° C. Preferably the reaction temperature is at least 40° C. and most preferably at least 50° C. To ensure that no free monomer is present, usually the reaction is continued for a time after the monomer addition. Also more initiator may need to be added as a scavenger during the final stage of the reaction to increase the reaction conversion.

Addition polymerization initiators useful in the practice of the invention include, for example, azo and diazo compounds, such as 2,2'-azobisisobutyronitrile, 2,2'-azobis (2,4-dimethyl valeronitrile), 2,2'-azobis(2,3-dimethyl butyronitrile), 2,2'-azobis(2-methyl butyronitrile), 2,2'-azobis(2,3,3-trimethyl butyronitrile), 2,2'-azobis(2-isopropyl butyronitrile), 1,1'-azobis(cyclohexane-1-carbonitrile), 2,2'-azobis(4-methoxyl-2,4-dimethyl valeronitrile), 2-(carbamoylazo)isobutyronitrile, 4,4'-azobis (4-cyanovaleric acid), and dimethyl -2,2'azobis isobutyrate, or peroxide compounds, such as butyl peroxide, propyl peroxide, butyryl peroxide, benzoyl isobutyryl peroxide, and benzoyl peroxide, or water soluble initiators, for example, sodium persulfate, and potassium persulfate, or any redox initiators. Preferred initiators are the oil soluble initiators. Examples of particularly suitable initiators are azo, peroxide, persulfate, and redox initiators. The initiators may be used in an amount varying from about 0.2 to 4 weight percent or higher by weight of the total monomers. A chain transfer agent, such as butyl mercaptan, may also be used to control the properties of the polymer formed.

The term "composite" means that the colorant particles prepared by the process of the invention comprise at least two physical phases, a colorant phase, free of solvent, and a polymer phase. The phase domains are not separated apart from each other, and there are bonds or interfaces between them. The composite polymer-dye particles preferably have a particle size of less than 1 $\mu$m, more preferably they have a particle size of less than 200 nm, and most preferably, they have a particle size of less than 100 nm. It is preferred that the polymer phase has a molecular weight of greater than about 5000, and more preferably greater than 10,000. In one suitable embodiment, the composite polymer-dye particles have a mean size of less than about 200 nm, and the polymer phase of each particle has a molecular weight of greater than about 5000. The ratio of the colorant phase to the polymer phase is preferably from about 10:90 to about 90:10, and more preferably from about 20:80 to about 50:50. The co-stabilizer will remain associated with the composite polymer dye particles. Generally, the co-stabilizer is on the surface of the polymer dye particles and operates to stabilize the particles.

While the polymer-dye particles prepared by the process of the invention described herein are illustrated for use in ink jet inks, they may also have other applications such as, e.g., in paints, inks for writing pens, markers, cosmetic products, etc.

In forming an ink jet ink, it is desirable to make the polymer-dye particles in the form of a concentrate. The concentrate is then diluted with an appropriate solvent to a concentration best for viscosity, color, hue, saturation density, and print area coverage for the particular application. Acceptable viscosities for such inks, as determined using a Brookfield apparatus and related methods, are generally not greater than 20 centipoise, and are preferably in the range of about 1 to 15 centipoise.

The polymer-dye particles prepared by the process of the invention can comprise up to about 30% by weight of an ink jet ink composition, and preferably from about 0.05 to 15 wt. %. Co-solvents or a humectant can also be added to the ink composition to help prevent the ink from drying out or crusting in the orifices of the printhead. Classes of co-solvents and humectants which may be employed include, but are not limited to, monohydric alcohols with carbon chains greater than about 10 carbon atoms such as decanol, dodecanol, oleoyl alcohol, stearoyl alcohol, hexadecanol, eicosanol, polyhydric alcohols, such as ethylene glycol, alcohol, diethylene glycol(DEG), triethylene glycol, propylene glycol, tetraethylene glycol, polyethylene glycol, glycerol, 2-methyl-2,4-pentanediol, 2-ethyl-2-hydroxymethyl-1,3-propanediol(EHMP), 1,5-pentanediol, 1,2-hexanediol, 1,2,6-hexanetriol and thioglycol; lower alkyl mono- or di-ethers derived from alkylene glycols, such as ethylene glycol mono-methyl or mono-ethyl ether, diethylene glycol mono-methyl or mono-ethyl ether, propylene glycol mono-methyl or mono-ethyl ether, triethylene glycol mono-methyl or mono-ethyl ether, diethylene glycol di-methyl or di-ethyl ether, poly(ethylene glycol) monobutyl ether (PEGMBE), and diethylene glycol monobutylether (DEGMBE); nitrogen-containing compounds, such as urea, 2-pyrrolidinone, N-methyl-2-pyrrolidinone, and 1,3-dimethyl-2-imidazolidinone; and sulfur-containing compounds such as dimethyl sulfoxide and tetramethylene sulfone.

In an ink jet ink, the polymer phase composition can be selected to maximize the compatibility of the composite particles with the organic solvent used in the formulation, and to maximize the interaction with the substrate where the ink is applied. The maximized compatibility with the organic solvent produces long-term storage stability, and the maximized interaction with the substrate improves the adhesion or smudge resistance of the image area.

Polymeric binders can also be added to an ink prepared using the polymer-dye particles prepared by the process of the invention to improve the adhesion of the colorant to the support by forming a film that encapsulates the colorant upon drying. Examples of polymers that can be used include polyesters, polystyrene/acrylates, sulfonated polyesters, polyurethanes, polyimides, and the like. The polymers may be present in amounts of from about 0.01 to about 15 percent by weight, and more preferably from about 0.01 to about 5 percent by weight based on the total amount of components in the ink.

A biocide may be added to an ink jet ink composition to suppress the growth of micro-organisms such as molds, fungi, etc. in aqueous inks. A preferred biocide for an ink composition is Proxel® GXL (Zeneca Specialties Co.) at a final concentration of 0.0001–0.5 wt. %. Additional additives which may optionally be present in an ink jet ink composition include thickeners, conductivity enhancing agents, anti-kogation agents, drying agents, waterfast agents, dye solubilizers, chelating agents, binders, light stabilizers, viscosifiers, buffering agents, anti-mold agents, anti-curl agents, stabilizers, and defoamers.

Ink jet inks made using polymer-dye particles prepared by the process of this invention are employed in ink jet printing wherein liquid ink drops are applied in a controlled fashion to an ink receptive substrate, by ejecting ink droplets from plurality of nozzles, or orifices, in a print head of ink jet printers.

Commercially available ink jet printers use several different methods to control the deposition of the ink droplets. Such methods are generally of two types: continuous stream and drop-on-demand.

In drop-on-demand systems, a droplet of ink is ejected from an orifice directly to a position on the ink receptive layer by pressure created by, for example, a piezoelectric device, an acoustic device, or a thermal process controlled in accordance digital data signals. An ink droplet is not generated and ejected through the orifices of the print head unless it is needed. Ink jet printing methods, and related printers, are commercially available and need not be described in detail.

Ink jet inks using polymer-dye particles prepared by the process of this invention can be employed in ink jet printing wherein liquid ink drops are applied in a controlled fashion to an ink receptive layer substrate, by ejecting ink droplets from the plurality of nozzles, or orifices, in a print head of ink jet printers.

Ink-receptive substrates useful in ink jet printing are well known to those skilled in the art. Representative examples of such substrates are disclosed in U.S. Pat. Nos. 5,605,750; 5,723,211; and 5,789,070 and EP 813 978 A1, the disclosures of which are hereby incorporated by reference.

The following examples illustrate the utility of the present invention:

EXAMPLES

The following dyes were used in the present invention:

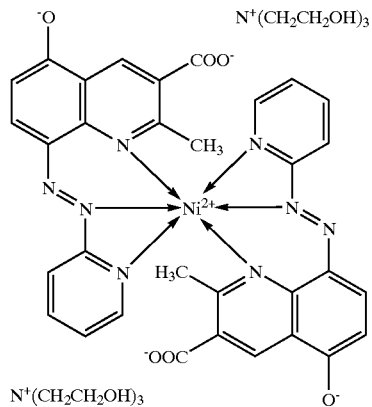

Water Soluble Control Dye-1

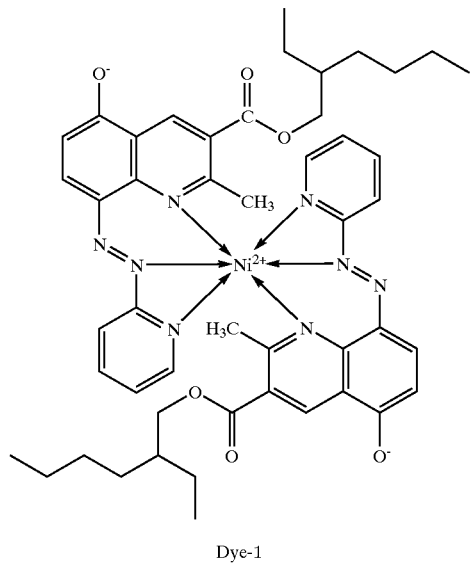

Dye-1

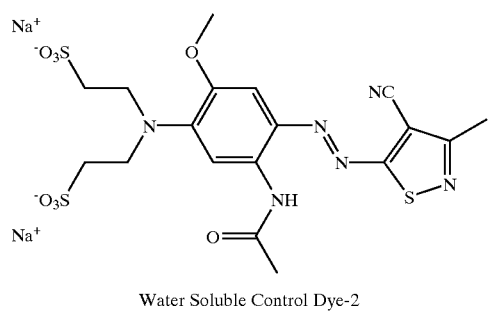

Water Soluble Control Dye-2

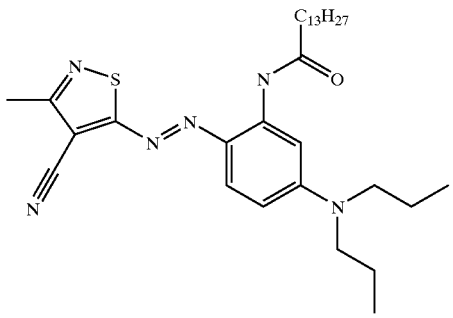

Dye-2A

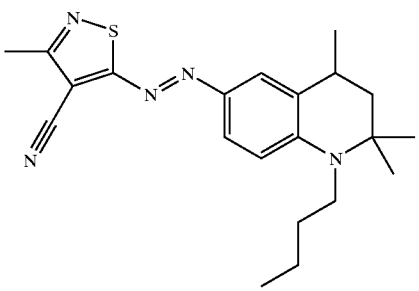

Dye-2B

Preparation of Polymer-Dye Particle Dispersions
Polymer-Dye Particle Dispersion 1 (I-1)

In a 400 ml beaker, 1 g of Dye-1 was added, and also added were 2.4 g of styrene, 2.4 g of butyl methacrylate, 1.2 g of divinyl benzene, and 2.0 g of ethyl acetate. After the addition, the mixture was well stirred. In another beaker, 50 g of deionized water, 0.6 g of sodium dodecyl sulfonate surfactant, and 1.8 g of hexadecane were added and well stirred. The organic phase and the aqueous phase were agitated violently under either sonification or microfluidizer for more than 20 minutes. The organic aqueous mixture was added to the reactor, and 0.09 g of initiator azobisisobutyronitrile (AIBN) in 1 gram of toluene was then added to the reactor. The reaction was allowed to continue for 4 more hours before the reactor was cooled down to room temperature. The organic solvent was removed under reduced pressure. The polymer-dye particle dispersion prepared was filtered through glass fibers to remove any coagulum. The particles made contain about 50% by weight of a colorant phase and about 50% by weight of a polymer phase. The initiator was added before the sonification or microfluidizer. The particle size was measured by a Microtrac Ultra Fine Particle Analyzer (Leeds and Northrup) at a 50% median value. The polymer-dye particles are designated as Polymer-dye Particle Dispersion 1 (I-1). These results are in Table 1.

Polymer-Dye Particle Dispersion 2 (I-2)

Polymer-dye Particle Dispersion 2 was prepared in a similar manner to Polymer-dye Particle Dispersion 1 except different monomers were used (as listed in Table 1) to prepare the polymer-dye particle dispersion.

Polymer-Dye Particle Dispersion 3 (I-3)

Polymer-dye Particle Dispersion 3 was prepared in a similar manner to Polymer-dye Particle Dispersion 1 except Dye-2A was used instead of Dye-1.

Polymer-Dye Particle Dispersion 4 (I-4)

Polymer-dye Particle Dispersion 4 was prepared in a similar manner to Polymer-dye Particle Dispersion 1 except Dye-2B was used instead of Dye-1.

Comparative Polymer-Dye Particle Dispersion 1 (C-1)

In a 400 ml beaker, 1 g of Dye 1 was added, and also added were 2.4 g of styrene, 2.4 g of butyl methacrylate, 1.2 g of divinyl benzene, and 2.0 g of ethyl acetate. After the addition, the mixture was well stirred. In another beaker, 50 g of deionized water and 0.9 g of sodium dodecyl sulfonate surfactant were added and well stirred. The organic aqueous mixture was added to the reactor and 0.09 g of initiator azobisisobutyronitrile (AIBN) in 1 gram of toluene was then added to the reactor. The reaction was allowed to continue for 4 more hours before the reactor was cooled down to room temperature. The polymer-dye particle dispersion prepared was filtered through glass fibers to remove any coagulum. The particles made contain about 50% by weight of a colorant phase and about 50% by weight of a polymer phase. The polymer-dye particles are designated as Comparative Polymer-dye Particle Dispersion 1 (C-1). The particle size was measured by a Microtrac Ultra Fine Particle Analyzer (Leeds and Northrup) at a 50% median value. These results are also in Table 1.

Comparative Polymer-Dye Particle Dispersion 2 (C-2)

Comparative Polymer-dye Particle Dispersion 2 was prepared in a similar manner to Comparative Polymer-dye Particle Dispersion 1 except that different monomers (as shown in Table 1) were used to prepare the polymer-dye particle dispersion.

The procedure used to prepare the Comparative Polymer-dye Particle Dispersion is significantly different compared with the one used to prepare the inventive Polymer-dye Particle Dispersion in that no co-stabilizer was added to the reactor and the organic aqueous phase mixture was not treated with either sonification and/or microfluidizer.

TABLE 1

| Polymer-dye Particle Dispersion | Polymer Composition* (wt. ratios) | Initiator | Particle Size (nm) |
|---|---|---|---|
| Dispersion I-1 | S/BMA/DVB (40/40/20) | AIBN | 78 |
| Dispersion I-2 | S/BZMA/BMA/DVB (20/20/40/20) | AIBN | 87 |
| Dispersion I-3 | S/BMA/DVB (40/40/20) | AIBN | 120 |
| Dispersion I-4 | S/BMA/DVB (40/40/20) | AIBN | 139 |
| Dispersion C-1 | S/BMA/DVB (40/40/20) | AIBN | Coagulum |
| Dispersion C-2 | S/BZMA/BMA/DVB (20/20/40/20) | AIBN | Coagulum |

Note: *BMA = butyl methacrylate; DVB = divinyl benzene; S = styrene; BZMA = Benzene methacrylate.

Ink Preparation

Comparative Ink 1 (Ink C-1) (Water Soluble Dye)

To prepare a comparative inkjet ink, 0.6 g of Control Dye 1 (10% active), 0.05 g Surfynol® 465 (Air Products Inc.), 1.2 g diethylene glycol, 1.0 g of glycerol, and 0.3 g di(propyleneglycol) methyl ether (Dowanol® DPM) were added distilled water so that the final ink is 10.0 g. The final ink contained 0.6% Control Dye-1, 0.50% Surfynol® 465, 12% diethylene glycol, 10% glycerol, and 3% di(propyleneglycol) methyl ether. The solution was filtered through a 3 μm polytetrafluoroethylene filter and filled into an empty Epson 660 inkjet cartridge.

Comparative Ink 2 (Ink C-2) (Water Soluble Dye)

Comparative Ink 2 was prepared similar to Comparative Ink 1 (Ink C-1) except that 0.3 g of Control Dye-2 was used instead of Control Dye-1. The final ink contained 3% of Control Dye-2.

Ink 1 of the Invention (Ink I-1) (Water Insoluble Dye)

This ink was prepared similar to Comparative Ink 1 (Ink C-1) except that Polymer-dye Particle Dispersion 1 (Dispersion I-1) was used instead of Control Dye 1. To prepare this ink, 5.0 g of Polymer-dye Particle Dispersion 1, 0.05 g Surfynolt 465 (Air Products Inc.), 1.2 g diethylene glycol, 0.6 g glycerol and 0.3 g di(propyleneglycol) methyl ether (Dowanol® DPM) were added distilled water so that the final ink is 10.0 g. The final ink contained 50% of the Polymer-dye Particle Dispersion 1 (about 10% active), 0.50% Surfynol® 465, 12.0% diethylene glycol, 6% glycerol, and 3% di(propyleneglycol) methyl ether. The solution was filtered through a 3 μm polytetrafluoroethylene filter and filled into an Epson 660 ink jet cartridge.

Ink 2 of the Invention (Ink I-2) (Water Insoluble Dye)

Ink I-2 was prepared similar to Ink I-1 except that Polymer-dye Particle Dispersion 2 (Dispersion I-2) was used instead of Polymer-dye Particle Dispersion 1 (Dispersion I-1).

Ink 3 of the Invention (Ink I-3) (Water Insoluble Dye)

Ink I-3 was prepared similar to Ink I-1 except that Polymer-dye Particle Dispersion 3 (Dispersion I-3) was used instead of Polymer-dye Particle Dispersion 1 (Dispersion I-1).

Ink 4 of the Invention (ink I-4) (Water Insoluble Dye)

Ink I-2B was prepared similar to Ink I-1 except that Polymer-dye Particle Dispersion 4 (Dispersion I-4) was used instead of Polymer-dye Particle Dispersion 1 (Dispersion I-1).

Comparative Ink 3 (Ink C-3) (Water Insoluble Dye)

Comparative Ink 3 (Ink C-3) was prepared similar to Ink I-1 except that Comparative Polymer-dye Particle Dispersion 1 (Dispersion C-1) was used instead of Polymer-dye Particle Dispersion 1 (Dispersion I-1).

Comparative Ink 4 (Ink C-4) (Water Insoluble Dye)

Comparative Ink 4 (Ink C-4) was prepared similar to Ink I-1 except that Comparative Polymer-dye Particle Dispersion 2 (Dispersion C-2) was used instead of Polymer-dye Particle Dispersion 1 (Dispersion I-1).

Ink Characterization:

The inks were placed in a sample bottle made of glass and allowed to stand at room temperature for up to three months. At the end of each month, the particle size was measured as described above. Any significant change in particle size and size distribution compared to that for the fresh sample was taken as an indication that the ink has poor storage stability. The firability of the ink was tested by filling the ink in an Epson 660 empty cartridge, printing a nozzle check pattern using the Epson 660 printer driver and test images consisting of a series of patches approximately 15 by 13 mm in size, ranging from 5% dot coverage to 100% dot coverage onto commercially available Epson Premium Glossy Paper, Cat. No SO41286. Inks having missing nozzles and banding in the printed images after several cleaning cycles are considered to have poor firability. Inks without missing nozzles and banding after less than 3 cleaning cycles are considered to have good firability.

TABLE 2

| Ink | Storage stability | Firability |
|---|---|---|
| Ink I-1A | good | good |
| Ink I-1B | good | good |
| Ink I-2A | good | good |
| Ink I-2B | good | good |
| Ink C-3 | poor | poor |
| Ink C-4 | poor | poor |

The above results show that an ink formulated from particles prepared by the process of the invention has good ink storage stability and firability as compared to inks using particles prepared by methods used in the art.

Printing Test

Prints using the ink in the present invention were prepared using test images consisting of a series of 6 variable density patches, approximately 15 by 13 mm in size, ranging from 5% dot coverage to 100% dot coverage printed onto commercially available Epson Premium Glossy Paper, Cat. No SO41286, with a Epson 660 Ink jet printer, using the above inks. The prints were allowed to dry for 24 hours at ambient temperature and humidity.

Stability Tests

The above prints were then placed in an ozone chamber (~5 ppm ozone level, 50% relative humidity) for 6 hours. The Status A reflection densities of the maximum density patch of the elements were measured using an X-Rite® 414 densitometer before and after the ozone fade test. The percentages of the Status A densities retained for the 100% dot coverage patches were calculated and are listed in Table 3.

TABLE 3

| Ink | Ozone Test (% Retained at 100% Dot Coverage) |
| --- | --- |
| Ink C-1 | 5 |
| Ink I-1 | 73 |
| Ink I-2 | 51 |
| Ink C-2 | 45 |
| Ink I-3 | 71 |
| Ink I-4 | 60 |

The above results show that an ink formulated from particles prepared by the process of the invention has improved resistance to ozone as compared to inks using particles prepared using methods in the art.

The invention has been described in detail with particular reference to certain preferred embodiments thereof, but it will be understood that variations and modifications can be effected within the spirit and scope of the invention.

What is claimed is:

1. A process for making polymer-dye particles comprising, in order:
   I) forming a colorant mixture comprising a water insoluble dye and an organic medium containing at least one ethylenically-unsaturated monomer;
   II) combining the colorant mixture with an aqueous mixture comprising a surfactant and a co-stabilizer to form a colorant mixture/aqueous mixture;
   III) causing the colorant mixture/aqueous mixture to form a stable aqueous droplet mixture via strong agitation; and
   IV) initiating polymerization to form composite polymer-dye particles comprising a colorant phase and a polymer phase, wherein said polymer dye particles have a mean particle size of less than 100 nm and the co-stabilizer is associated with the polymer-dye partickes; and
   wherein an addition polymerization initiator is added prior to initiating polymerization.

2. The process of claim 1 wherein the co-stabilizer is clay, silica, or an inorganic metal salt, hydroxide or oxide; a starch, a sulfonated cross-linked organic homopolymer, a resinous polymer or copolymer, hexadecane, cetyl alcohol, or any steric hydrophobic stabilizer.

3. The process of claim 1 wherein the co-stabilizer is hexadecane, cetyl alcohol, or a steric hydrophobic stabilizer.

4. The process of claim 1 wherein the polymer formed is a homopolymer.

5. The process of claim 1 wherein the polymer formed is a cross-linked polymer and the organic medium contains a mixture of ethylenically-unsaturated monomers comprising:
   a) at least one ethylenically-unsaturated monomer being free of ionic charge groups and being capable of addition polymerization to form a substantially water-insoluble homopolymer; and
   b) at least one ethylenically-unsaturated monomer capable of being a cross-linker.

6. The process of claim 1 wherein the polymer formed is a copolymer containing at least one ethylenically-unsaturated monomer being free of ionic charge groups and being capable of addition polymerization to form a substantially water-insoluble homopolymer.

7. The process of claim 1 wherein the strong agitation is sonification, homogenization, or microfluidization.

8. The process of claim 1 wherein the water insoluble dye is a xanthene dye, anthroquinone dye, methine or polymethine dye, merocyanine dye, azamethine dye, azine dye, quinophthalone dye, thiazine dye, oxazine dye, phthalocyanine dye, mono or poly azo dye, or metal complex dye.

9. The processs of claim 1 where the water insoluble dye is an azo dye or a metal complex dye.

10. The process of claim 9 wherein the azo dye is an arylazoisothiazole dye.

11. The process of claim 9 wherein the metal complex dye is a transition metal complex of an 8-heterocyclylazo-5-hydroxyquinoline.

12. The process of claim 1 wherein the addition polymerization initiator is an azo initiator, a peroxide initiator, a persulfate initiator, or a redox initiator.

13. The process of claim 5 wherein the ethylenically-unsaturated monomer free of ionic charge groups is methyl methacrylate, ethyl methacrylate, butyl methacrylate, ethyl acrylate, butyl acrylate, hexyl acrylate, n-octyl acrylate, lauryl methacrylate, 2-ethylhexyl methacrylate, nonyl acrylate, benzyl methacrylate, 2-hydroxypropyl methacrylate, acrylonitrile, methacrylonitrile, vinyl acetate, vinyl propionate, vinylidene chloride, vinyl chloride, styrene, t-butyl styrene, vinyl toluene, butadiene, or isoprene.

14. The process of claim 5 wherein the ethylenically-unsaturated monomer capable of being a cross-linker is vinyl acrylate, vinyl methacrylate; a diene; an ester of saturated glycols or diols with unsaturated monocarboxylic acids, or a polyfunctuional aromatic compound.

15. The process of claim 1 wherein the ratio of the colorant phase to the polymer is phase is from about 10:90 to about 90:10.

16. Composite polymer dye particles comprising a colorant phase containing a water insoluble dye and a polymer phase, said particles being associated with a co-stabilizer, wherein said polymer dye particles have a mean particle size of less than 100 nm and wherein the co-stabilizer is hexadecane, cetyl alcohol, or a steric hydrophobic stabilizer.

17. The composite polymer dye particles comprising a colorant phase containing a water insoluble dye and a polymer phase, said particles being associated with a co-stabilizer, wherein said polymer dye particles have a mean particle size of less than 100 nm and wherein the water insoluble dye is an azo dye or a metal complex dye.

18. The composite polymer dye particles of claim 17 wherein the azo dye is an arylazoisothiazole dye.

19. The composite polymer dye particles of claim 17 wherein the metal complex dye is a transition metal complex of an 8-heterocyclylazo-5-hydroxyquinoline.

* * * * *